United States Patent [19]

Takahashi et al.

[11] 4,354,089

[45] Oct. 12, 1982

[54] WELDING APPARATUS WITH FORWARD SHIFTABLE ELECTRODE TABLES

[75] Inventors: Hisashi Takahashi; Takao Kawanami, both of Tohkai; Keiji Sodeno; Toshihiko Baba, both of Amagasaki, all of Japan

[73] Assignees: Mitsubishi Denki Kabushiki Kaisha; Nippon Steel Corporation, both of Tokyo, Japan

[21] Appl. No.: 96,198

[22] Filed: Nov. 20, 1979

Related U.S. Application Data

[63] Continuation of Ser. No. 923,224, Jul. 10, 1978, abandoned.

[30] Foreign Application Priority Data

Jul. 12, 1977 [JP] Japan .................................. 52-83457

[51] Int. Cl.³ .............................................. B23K 11/04
[52] U.S. Cl. ........................................ 219/97; 219/101
[58] Field of Search ........................... 219/97, 100, 101

[56] References Cited

U.S. PATENT DOCUMENTS

| | | | |
|---|---|---|---|
| 2,162,229 | 6/1939 | Remington | 219/100 X |
| 2,758,184 | 8/1956 | Seeloff et al. | 219/97 |
| 2,787,698 | 4/1957 | Schlatter et al. | 219/101 |
| 3,036,204 | 5/1962 | Stieglitz et al. | 219/101 |
| 3,808,393 | 4/1974 | Goodwin et al. | 219/97 |
| 3,828,601 | 8/1974 | Tessman | 219/97 X |
| 3,916,140 | 10/1975 | Clews | 219/97 X |
| 4,025,214 | 5/1980 | Suzuki et al. | 219/97 |

FOREIGN PATENT DOCUMENTS 55-33862  3/1980  Japan ................................... 219/97

*Primary Examiner*—Gene Z. Rubinson
*Assistant Examiner*—Keith E. George
*Attorney, Agent, or Firm*—Oblon, Fisher, Spivak, McClelland & Maier

[57] ABSTRACT

A welding apparatus comprises a pair of clamping devices for clamping the workpieces to prevent slip under applying significantly large force to the butting surfaces for the butt welding operation and a pair of electrode tables for feeding a welding current. The welding apparatus need not comprise a step gauge bar nor an auxiliary clamp in order to set the projecting degree.

5 Claims, 10 Drawing Figures

WELDING APPARATUS WITH FORWARD SHIFTABLE ELECTRODE TABLES

This is a continuation of application Ser. No. 923,224, filed July 10, 1978, now abandoned.

BACKGROUND OF THE INVENTION

1. Field of the Invention

The present invention relates to a welding apparatus for welding workpieces in a butt welding. More particularly, it relates to a welding apparatus for precisely and speedy setting each projecting degree of each workpiece required in the butt welding.

2. Description of the Prior Arts

FIG. 1 shows the conventional welding apparatus.

In FIG. 1, the reference (1) designates a movable frame which can be horizontally shifted to a stationary frame (2); (3a) and (3b) respectively designate a movable side upper electrode table and a movable side lower electrode table which are fitted on the movable frame (1). The upper electrode table (3a) can be vertically shifted by a movable side pressing device (6) whereas the lower electrode table (3b) is mounted on the movable frame (1). Thus, the workpiece (8) can be clamped between the upper electrode table (3a) and the lower electrode table (3b).

On the other hand, the mutual relations of a stationary side upper electrode table (4a), a stationary side lower electrode table (4b), a stationary side pressing device (7) and a workpiece (9) are the same with those of the parts in the movable frame (1) as described above.

Thus, the workpieces (8), (9) are respectively clamped by the electrode tables (3a), (3b) and (4a), (4b) to shift the workpieces (8), (9) to the butting direction so as to butt the edges thereof and a current is fed through the electrode table (3b), (4b) to the workpieces (8), (9) to attain the welding operation.

The most important feature for attaining excellent butt welding operation is to set the current passing distance for the workpieces (8), (9) i.e. the distance between each electrode (3b) and the end of each workpiece (8) and the distance between each electrode (4b) and the end of each workpiece (9) (See FIG. 1) should be set in suitable distance.

This distance is usually referred to as a projecting degree and suitable distance is selected depending upon the kind and size e.g. thickness of the workpiece. Thus, in the butt welding operation, it is necessary to set the optimum projecting degree depending upon the kind and size of the workpiece before feeding the current under butting the workpieces.

In FIG. 1, the reference (5) is a step gauge bar for setting the optimum projecting degrees and the step gauge bar (5) is disposed between the movable side electrode tables (3a), (3b) and the stationary side electrode tables (4a), (4b) and is vertically movable so as to contact the ends of the workpieces (8), (9) to the surfaces of the suitable step of the step gauge bar (5), whereby it sets the optimum projecting degrees of the workpieces (8), (9) under projecting from the side surfaces of the electrode tables (3a), (3b), (4a) and (4b).

The thickness of the step gauge bar (5) is varied to be several thickness in steps and the vertical position of the step gauge bar (5) is adjusted so as to contact the ends of the workpieces with the step of the step gauge bar corresponding to the workpiece.

When the movable frame (1) is shifted to the direction for the butt welding of the workpieces (8), (9), the step gauge bar (5) is removed so as to prevent the trouble.

It is possible to set the optimum projecting degree by the apparatus of FIG. 1. However, in accordance with the conventional apparatus, many steps of the step gauge bar (5) are required for corresponding the projecting degree to the optimum one in wide ranges of kinds of materials and sizes of the workpieces, whereby the disadvantages of complicated operations for controlling the step gauge bar such as setting and removing operations have been found.

In order to overcome the disadvantages, the conventional apparatus shown in FIG. 2 has been proposed.

The apparatus shown in FIG. 2 has the novel feature that shear units (10a), (10b), auxiliary clamps (11a), (11b) and (12a), (12b) and auxiliary clamp delivery devices (13), (14) are employed instead of the step gauge bar (5) which is considerably different from the feature of the embodiment shown in FIG. 1.

In the apparatus of FIG. 1, the projecting degree of the workpiece is set by the step gauge bar (5) whereas in the apparatus of FIG. 2, the edges of the workpieces (8), (9) projected from the electrode tables (3a), (3b) and (4a), (4b) are sheared off at the specific positions by the shear units (10a), (10b) and the workpiece (8) is fixed by the auxiliary clamps (11a), (11b) and the auxiliary clamps (11a), (11b) are shifted to approach or to depart by the movable side auxiliary clamp delivery device (13) to set the optimum projecting degree of the workpiece (8). When the workpiece (8) is shifted for setting the projecting degree, the electrode tables (3a), (3b) should be opened. On the other hand, the projecting degree of the workpiece (9) in the stationary frame (2) is set by employing the auxiliary clamps (12a), (12b), and the stationary side auxiliary clamp delivery device (14) in the same manner with those of the movable side at the same time.

When the movable frame (1) is shifted to the butting direction, for the butt welding of the workpieces (8), (9), the shear units (10a), (10b) can be removed to prevent the trouble.

In accordance with the apparatus of FIG. 2, there is no disadvantage of the apparatus of FIG. 1 since a step gauge bar is not employed. Accordingly, it is possible to carry out the welding of various workpieces in wide ranges of kinds of materials and sizes.

However, the apparatus of FIG. 2 has the following disadvantages.

As well-known, considerably high force caused in the butt welding operation is received by the electrode tables whereby the electrode tables should be large in size and the pressing devices should have considerably high power whereby a relatively long time is required for shifting the electrode table.

However, in the apparatus of FIG. 2, the workpieces (8), (9) are clamped by the electrode tables (3a), (3b) and (4a), (4b) for shearing the workpieces and then, the workpieces are released when the auxiliary clamps (11a), (11b) and (12a), (12b) are shifted for setting the projecting degree and then, the workpieces are clamped again for welding them whereby a long time is required for the welding operation.

SUMMARY OF THE INVENTION

It is an object of the present invention to provide a welding apparatus which comprises a pair of clamping devices for clamping the workpieces to prevent slip under applying significantly large force to the butting surfaces for the butt welding operation and a pair of electrode tables for feeding a welding current and which need not comprise a step gauge bar nor an auxiliary clamp in order to set the projecting degree.

The welding apparatus of the present invention comprises a pair of clamping devices which clamp workpieces disposed with a specific gap and shift the workpieces to butt them in the welding operation; a pair of electrode tables which are disposed in each of the clamping devices to feed a welding current through the butted workpieces, wherein the electrode table can be shifted to the butting direction for the workpieces.

BREIF DESCRIPTION OF THE DRAWINGS

DETAILED DESCRIPTION OF THE PREFERRED EMBODIMENTS

Figure 3:
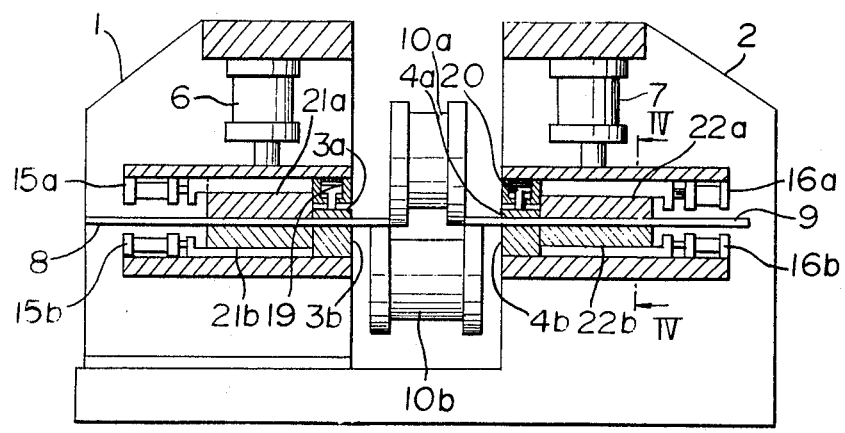
FIG. 3 is a front sectional view of one embodiment of the welding apparatus according to the present invention.
Figure 4:
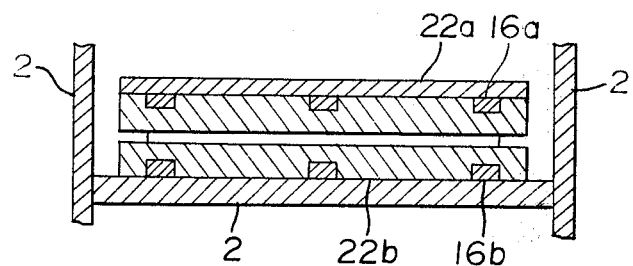
FIG. 4 is a sectional view taken along the line IV—IV of FIG. 3.

FIG. 3 is a front sectional view of one embodiment of the present invention and FIG. 4 is a sectional view taken along the line IV—IV of FIG. 3.

In FIGS. 3 and 4, the reference (3a) designates a movable side upper electrode table; (3b) designates a movable side lower electrode table; (19) designates a movable side electrode pressing device to press the movable side upper electrode table (3) toward the movable lower electrode table (3b) and to fix the workpiece (8) between them. The references (21a) and (21b) designate movable side clamping devices which are disposed out of the electrode tables (3a), (3b). The reference (15a) and (15b) designate movable side electrode projecting degree adjustors for shifting the movable side electrode table (3a), (3b) to the butting direction; (6) designates a movable side pressing device comprising the movable side electrode table pressing device (19), the movable side electrode projecting degree adjustor (15a) and the movable side clamping device (21a) to press the movable side upper electrode table (3a) and the movable side clamping device (21a) to the surface of the workpiece or to release them.

The movable side pressing device (6), the movable side clamping device (21b) and the movable side electrode projecting degree adjustor (15b) are fitted on the movable frame (1).

On the other hand, the stationary frame (2) is disposed to face the movable frame (1). The stationary side upper electrode table (4a), the stationary side lower electrode table (4b), the stationary side electrode pressing device (20), the stationary side clamping devices (22a), (22b), the stationary side electrode projecting degree adjustors (16a), (16b) and the stationary side pressing device (7) are fitted on the stationary frame (2). These parts operate in the same manner with those of the movable side parts.

The references (10a) and (10b) designate shear units disposed between the movable side electrode tables (3a), (3b) and the stationary side electrode tables (4a), (4b) to shear the specific position of the workpieces (8), (9) projected from the clamping devices (21a), (21b) and (22a), (22b).

Incidentally, when the movable frame (1) shifts the workpiece (8) to the butting direction, the shear units (10a), (10b) are removed to prevent a trouble.

A current feeder (not shown) is connected to the lower electrodes (3a), (3b) for the welding operation.

Referring to FIGS. 6 to 9 showing the operations in orders, the operations will be illustrated.

Figure 6:
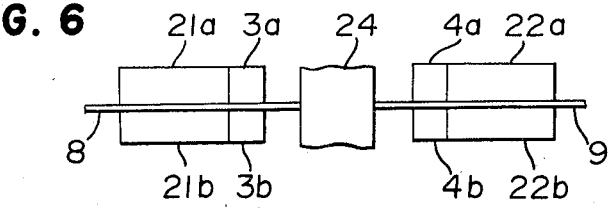
FIG. 6 is a diagram of a mechanism for setting a position by a gauge bar.

FIG. 6 shows one embodiment wherein the gauge bar (24) is disposed between the electrode tables (3a), (3b) and (4a), (4b).

Figure 1:
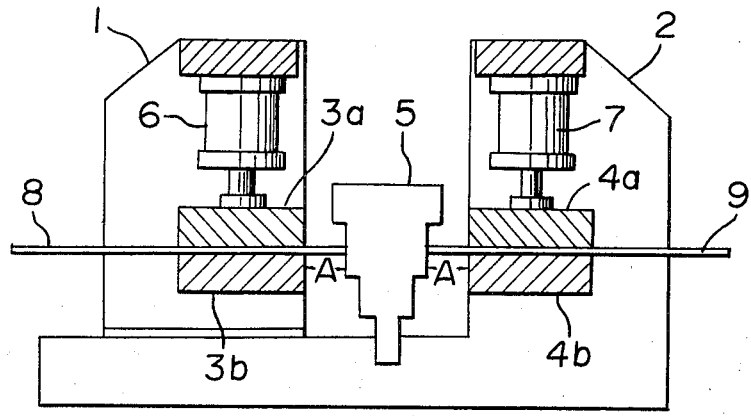
FIG. 1 is a front sectional view of one embodiment of the conventional welding apparatus.

The gauge bar (24) is different from the conventional step gauge bar (5) shown in FIG. 1 and has a constant thickness whereby the projecting degrees of the workpieces (8), (9) projected from the clamping devices (21a), (21b) and (22a), (22b) are always constant.

Figure 7:
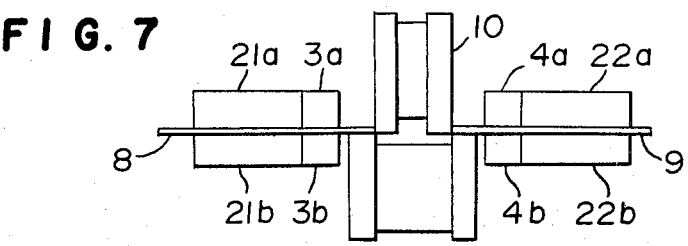
FIGS. 7 to 9 are views for showing operations of one embodiment of the present invention.

FIG. 7 shows the other embodiment wherein the specific positions of the workpieces (8), (9) are sheared by the shear unit (10).

In both of the embodiments of FIGS. 6 and 7, the positions of the ends of the workpieces (8), (9) are arranged with a constant gap in every case.

Figure 2:
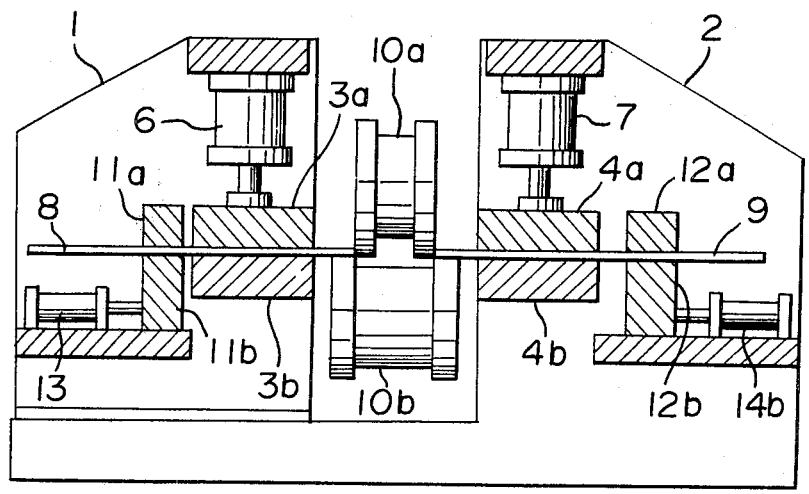
FIG. 2 is a front sectional view of the other embodiment of the conventional welding apparatus.
Figure 8:
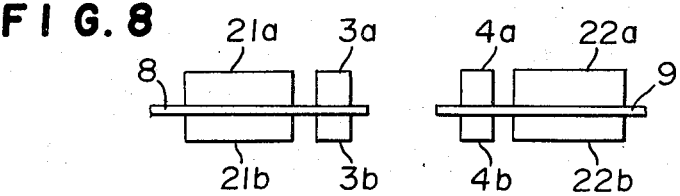

As shown in FIG. 8, the movable side electrode tables (3a), (3b) and the stationary side electrode tables (4a), (4b) are shifted whereby the distances from the ends of the electrode tables (3a), (3b) and (4a), (4b) to the end of the workpieces (8), (9) are set to suitable distances depending upon the kind and size of the workpieces (8), (9). That is, the electrode tables (3a), (3b) and (4a), (4b) are shifted under loosening or releasing the clamping by the electrode tables (3a), (3b) and (4a), (4b) while maintaining the clamping conditions of the workpieces (8), (9) by the clamping devices (21a), (21b) and (22a), (22b). Accordingly, it is unnecessary to shift the clamping devices (21a), (21b) and (22a), (22b) after shearing the workpieces (8), (9) as the embodiment of FIG. 2.

Figure 9:
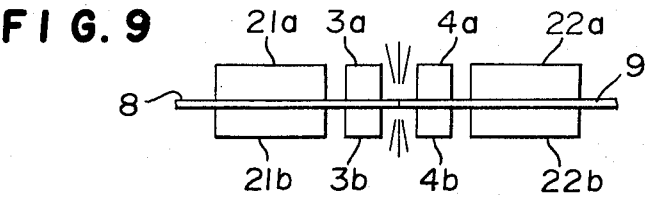

As shown in FIG. 9, the movable frame (1) is shifted to butt the workpieces (8), (9) whereby the butt welding is performed.

As well-known, heat is generated at the contacted surfaces of the workpieces by the welding current passing through the electrodes (3b), (4b) and the pressure is applied to them to perform the welding operation.

The pressure is applied by the frictional pressure under pressing between the clamping devices (21a), (21b) and (22a), (22b).

In the conventional butt welding operation such as the conventional flash welding operation, it is usually necessary to apply the pressure of 5 to 15 Kg/mm$^2$ to the butted surfaces. For example, when mild steel sheets having a thickness of 6 mm and a width of 1600 mm are welded, it is necessary to apply a considerably high pressure of about 80,000 Kg. Accordingly, considerably large clamping forces for clamping the workpieces are required.

In the present invention, the considerably large clamping forces are given by the clamping devices (21a), (21b) and (22a), (22b) and the clamping forces of the electrode tables (3a), (3b) and (4a), (4b) required for feeding the welding current are needed to apply the pressure only for passing the welding current whereby the clamping forces of the electrode tables can be only one over several time of the clamping forces required for the electrode tables of the conventional welding apparatus.

Figure 10:
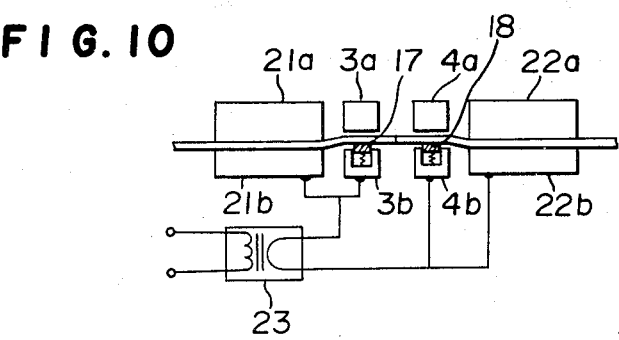
FIG. 10 is a view for showing operations of the other embodiment of the present invention.

FIG. 10 shows the other embodiment wherein a current is fed again to the welded part of the workpieces by utilizing the current feeder of the welding apparatus after the completion of the welding to perform a heat treatment and to improve the welded part.

After the completion of the welding, the heat generated at the welded part is lost by the electrode tables (3a), (3b) and (4a), (4b) between the electrode tables. In order to heat the welded part again, a large current being several times of the current in the flash welding is required.

In the conventional method, the electrode tables are shifted to open them and the movable frame (1) is shifted to enlarge the gap between the electrode table (3a), (3b) and the electrode table (4a), (4b) and then, the current is fed as the complicated operations.

In accordance with the present invention, the clamping devices are separated from the electrode tables and the current feeder (23) is connected so as to feed the current also through the clamping devices (21b), (22b) as in FIG. 10 and the space is formed between the movable side electrode tables (3a), (3b) and between the stationary side electrode tables (4a), (4b) so as to rapidly form a suitable gap between the tables, and accordingly, the same object can be attained.

It is possible to lift up the workpieces by the insulating materials (17), (18) so as to prevent contact of the workpieces (8), (9) with the electrode tables (3b), (4b) when the upper electrodes (3a), (4a) are lifted up. During the welding operation, the conductors connected to the electrode tables (3b), (4b) are shorter than the conductors connected to the clamping devices whereby the current is mainly passed through the electrode tables when the current is fed from one current feeder (23).

In the above-mentioned embodiment, the post-heat treatment by the welding apparatus after the completion of the welding operation can be attained by passing the current through the clamping devices (21b), (22b).

When it is unnecessary to pass the current through the clamping devices (21b), (22b), the projected parts are formed on the clamping surfaces of the clamping devices (21a), (21b) and (22a), (22b) for clamping the workpieces (8), (9) whereby the frictional coefficients on the clamping surfaces can be increased to increase the clamping forces for clamping the workpieces.

Figure 5:
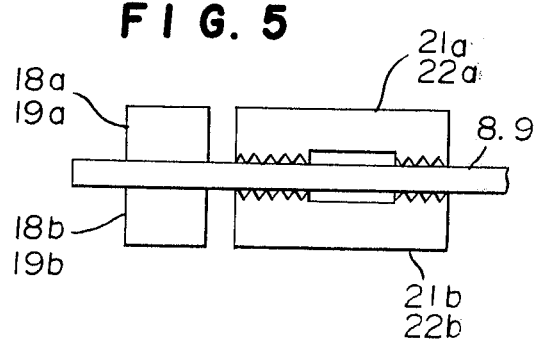
FIG. 5 is a partially enlarged view of a clamping device and an electrode table of the other embodiment of the present invention.

The electrode tables (18a), (19a), as seen in FIG. 5, and (18b), (19b) are usually made of copper.

Thus, in this embodiment, sharp projected parts are formed on the clamping surface of the clamping devices (21a), (22a) and (21b), (22b) made of hard steel having high hardness etc., the frictional coefficient can be further improved.

In accordance with the present invention, the electrode tables and the clamping devices are separated and the electrode table can be shifted to the butting direction as desired, whereby the step gauge bar or the auxiliary clamps for setting the projecting degree are not required and the clamping devices are not opened and closed in the setting of the projecting degree and the speed of the operation for setting the projected degree can be fast.

What is claimed is:

1. A welding apparatus which comprises:
a pair of clamping devices for clamping workpieces disposed with a specific gap and for shifting the workpieces to butt them in the welding operation; said specific gap being formed from a projecting portion extending outwardly from each of said workpieces and in the butting direction; said clamping devices remaining clamped onto said workpieces when the ends thereof are sheared by a shearing means to form said specific gap and throughout the remainder of said welding operation;
a pair of electrode tables which are respectively disposed in front of each of the clamping devices in the butting direction to feed a welding current through the workpieces when the workpieces are in a butting condition, said electrode tables being shifted relative to the clamping devices in the butting direction for the workpieces to adjust the distance between said electrode tables after the ends of the workpieces are sheared and to thereby reduce the length of said specific gap, and the clamping devices being more massive than the electrode tables to bear the greater part of the forces during the welding operation; said workpieces remaining stationary during the shifting movement of said electrode tables because of the clamping force of said pair of clamping devices, whereby the welding time period is reduced by eliminating a substantial amount of mechanical movement from the welding operation.

2. An apparatus according to claim 1 wherein one end of each workpiece is contacted with a gauge bar having a specific size disposed between the electrode tables so as to form a specific gap.

3. An apparatus according to claim 1 wherein projected parts are formed on the surfaces of the clamping devices for contacting with the workpieces.

4. A welding apparatus which comprises:
a pair of clamping devices for clamping workpieces disposed with a specific gap and for shifting the workpieces to butt them in the welding operation; said specific gap being formed from a projecting portion extending outwardly from each of said workpieces and in the butting direction; said clamping devices remaining clamped onto said workpieces when the ends thereof are sheared by a shearing means to form said specific gap and throughout the remainder of said welding operation;
a pair of electrode tables which are respectively disposed in front of each of the clamping devices in the butting direction to feed a welding current through the workpieces when the workpieces are in a butting condition, said electrode tables being shifted relative to the clamping devices in the butting direction for the workpieces to adjust the distance between said electrode tables after the ends of the workpieces are sheared and to thereby reduce the length of said specific gap, and the clamping devices being more massive than the electrode tables to bear the greater part of the forces during the welding operation; said workpieces remaining stationary during the shifting movement of said electrode tables because of the clamping force of said pair of clamping devices, whereby the welding time period is reduced by eliminating a substantial amount of mechanical movement from the welding operation;

means for moving both the clamping devices and the electrode tables into contact with the workpieces, wherein said means for moving serves to keep said clamping means clamped onto said workpiece but allows said electrode tables to shift.

5. A welding apparatus which comprises:

a pair of clamping devices for clamping workpieces;

a pair of electrode tables which are respectively disposed in front of each of the clamping devices to feed a welding current through the workpieces;

a pair of electrode pressing devices for moving the electrode tables in a direction perpendicular to the surface of the workpieces;

a pair of electrode projecting degree adjustors for shifting the electrode tables in a direction parallel to the surface of the workpieces;

a pair of pressing devices for moving said clamping tables, said electrode tables, said electrode pressing devices and said electrode projecting degree adjustors in a direction perpendicular to the surface of the workpieces.

* * * * *